(12) United States Patent
Souli et al.

(10) Patent No.: US 8,435,101 B2
(45) Date of Patent: May 7, 2013

(54) METHOD AND APPARATUS FOR PROCESSING A WING OF A POULTRY CARCASS WHILE THE WING IS ATTACHED TO SAID POULTRY CARCASS

(75) Inventors: Ramzi Souli, Oostzaan (NL); Willem Cornelis Steenbergen, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/406,054

(22) Filed: Feb. 27, 2012

(65) Prior Publication Data

US 2012/0220210 A1 Aug. 30, 2012

(30) Foreign Application Priority Data

Feb. 28, 2011 (NL) ...................................... 2006312

(51) Int. Cl.
  *A22C 21/00* (2006.01)
(52) U.S. Cl.
  USPC .......................................................... 452/169
(58) Field of Classification Search .................. 452/135, 452/136, 138, 139, 140, 149, 150
  See application file for complete search history.

(56) References Cited

U.S. PATENT DOCUMENTS

| | | | |
|---|---|---|---|
| 5,176,564 A | | 1/1993 | Hazenbroek |
| 5,569,069 A | * | 10/1996 | Horst et al. .................... 452/169 |
| 5,984,770 A | * | 11/1999 | Asano et al. ................... 452/165 |
| 6,007,416 A | * | 12/1999 | Janssen et al. ................. 452/135 |
| 6,277,020 B1 | * | 8/2001 | Stephens ........................ 452/135 |
| 6,929,541 B2 | * | 8/2005 | Cervantes et al. ............. 452/149 |
| 6,935,942 B1 | * | 8/2005 | Evers et al. .................... 452/157 |
| 7,004,830 B2 | * | 2/2006 | van der Steen et al. ........ 452/185 |
| 7,198,565 B2 | * | 4/2007 | Fujiwara et al. ............... 452/154 |
| 7,335,095 B2 | * | 2/2008 | Sekiguchi et al. ............. 452/169 |
| 7,341,505 B1 | * | 3/2008 | Gasbarro ........................ 452/169 |
| 7,344,437 B2 | * | 3/2008 | Van Den Nieuwelaar et al. .............................. 452/187 |
| 7,357,707 B2 | * | 4/2008 | de Vos et al. .................. 452/136 |
| 7,479,059 B2 | * | 1/2009 | Seesing .......................... 452/138 |

FOREIGN PATENT DOCUMENTS

| | | |
|---|---|---|
| EP | 1 868 443 | 11/2010 |
| WO | 2006/098619 | 9/2006 |

OTHER PUBLICATIONS

Search report for NL 2006312, dated Sep. 9, 2011.

* cited by examiner

*Primary Examiner* — Richard Price, Jr.
(74) *Attorney, Agent, or Firm* — Dority & Manning, P.A.

(57) ABSTRACT

A method and apparatus for processing a wing of a poultry carcass while the wing is attached to the poultry carcass that is suspended by the legs is provided. In an exemplary aspect, the method includes the step of cutting the wing in the upper wing adjacent to the elbow joint, and the step of moving the midwing in relation to the upper wing for separating the bones of the midwing and the upper wing, whereafter the midwing is cut loose from the upper wing while the latter remains attached to the poultry carcass. The step of cutting the wing in the upper wing adjacent to the elbow joint is executed to cut through the ligament that provides a connection between the midwing and upper wing.

10 Claims, 9 Drawing Sheets

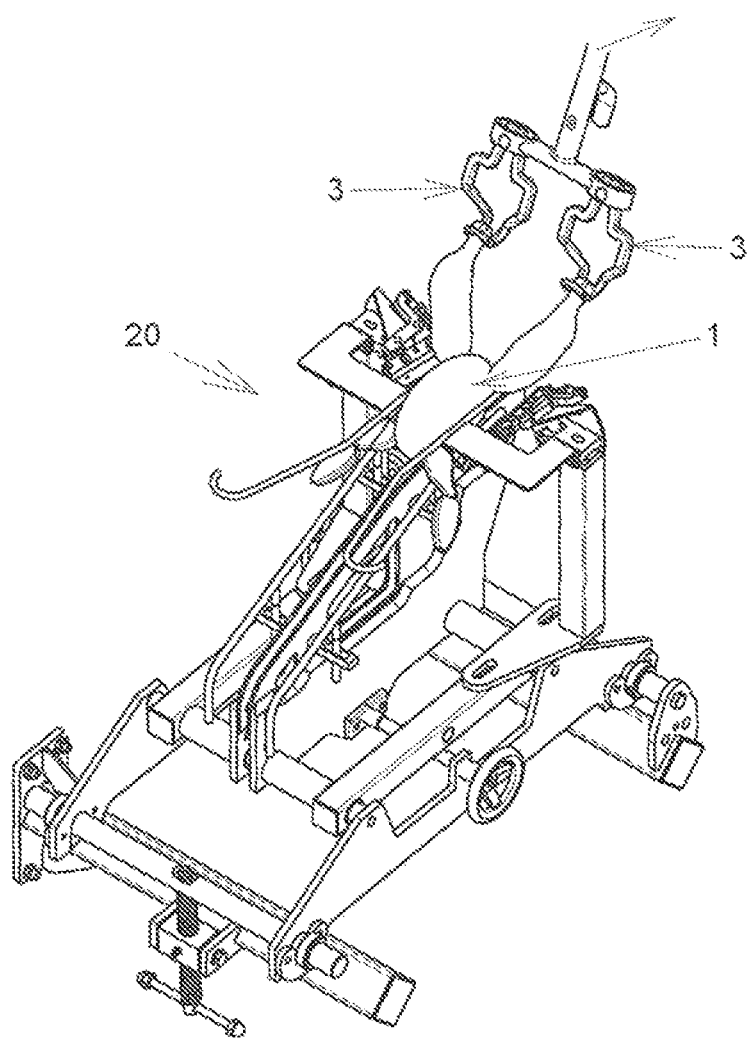
Fig: 2A

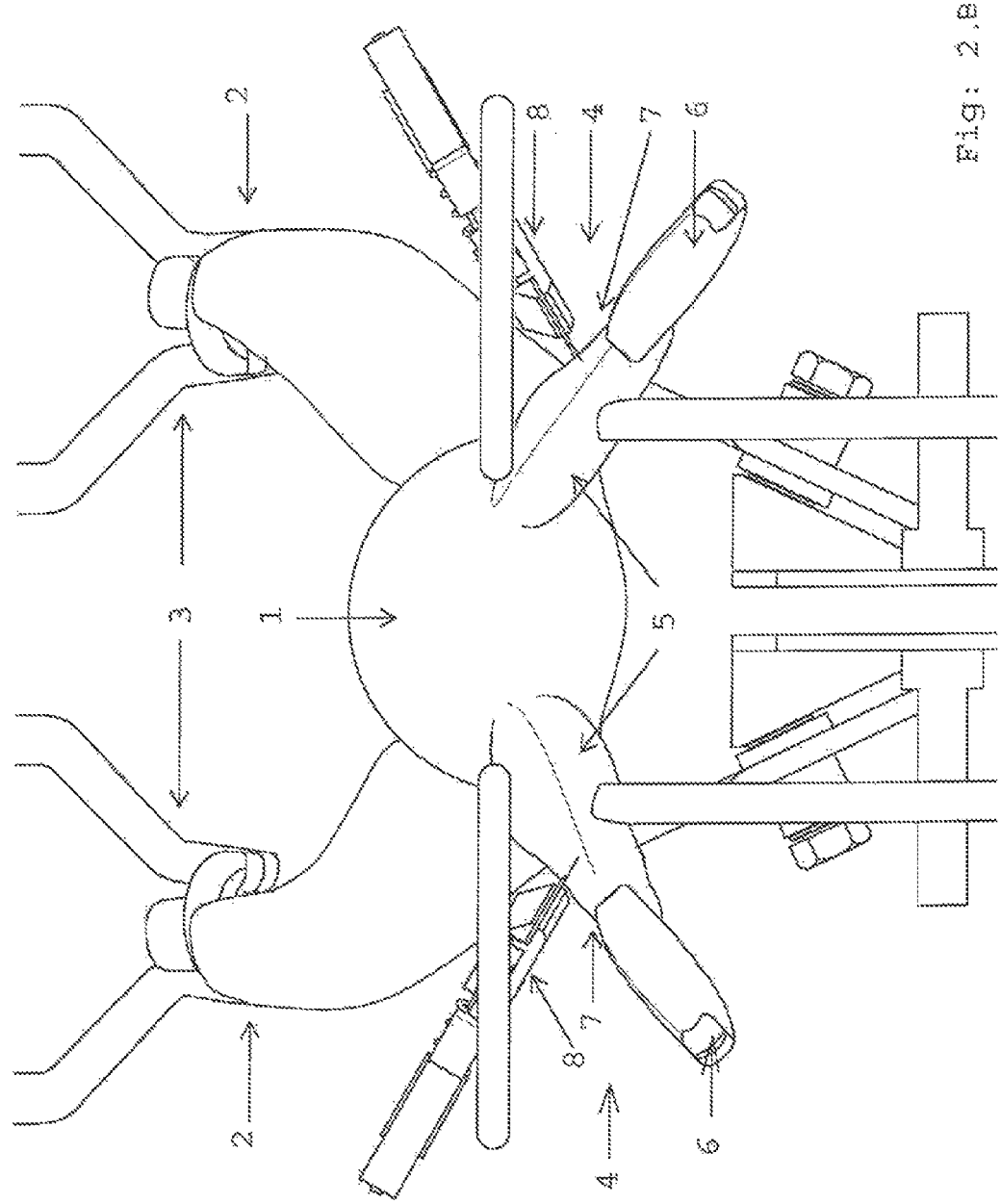

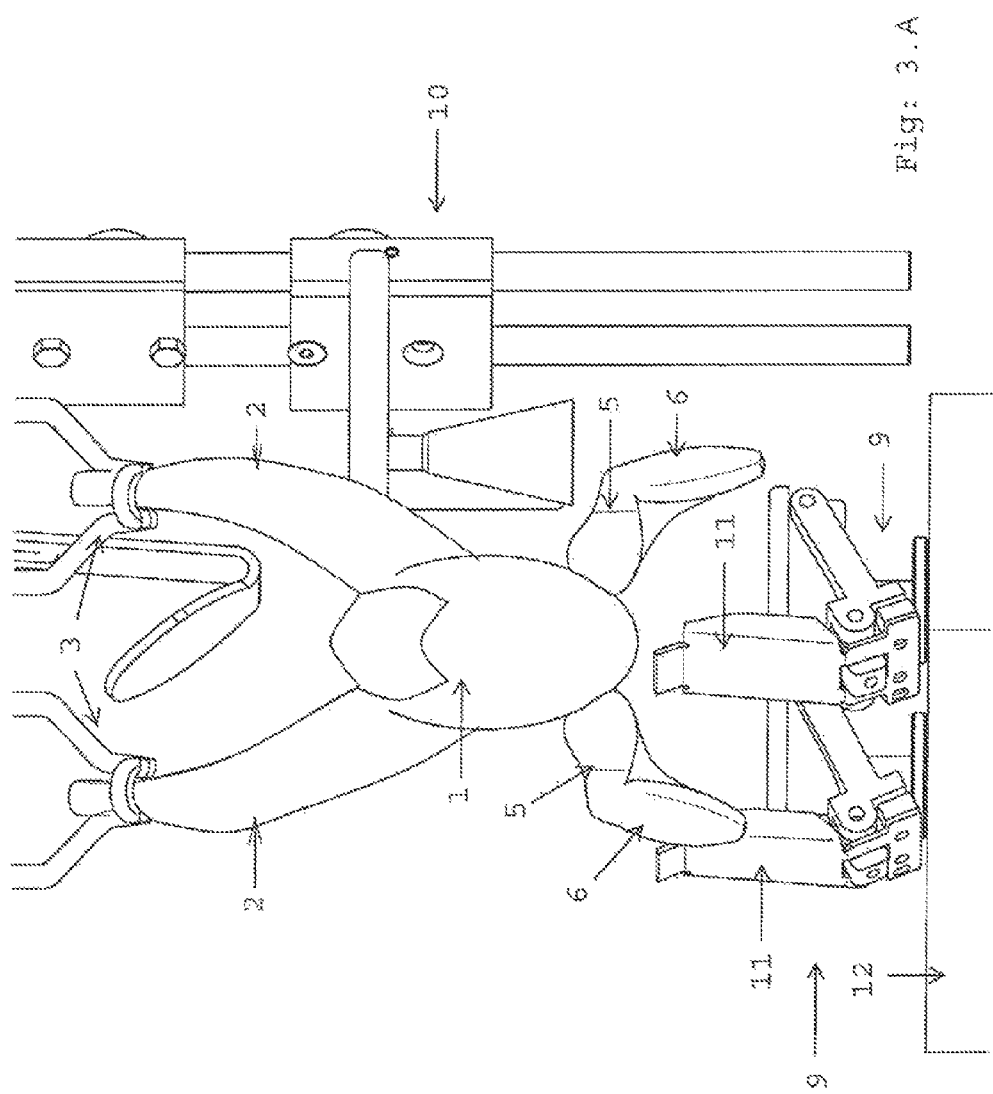

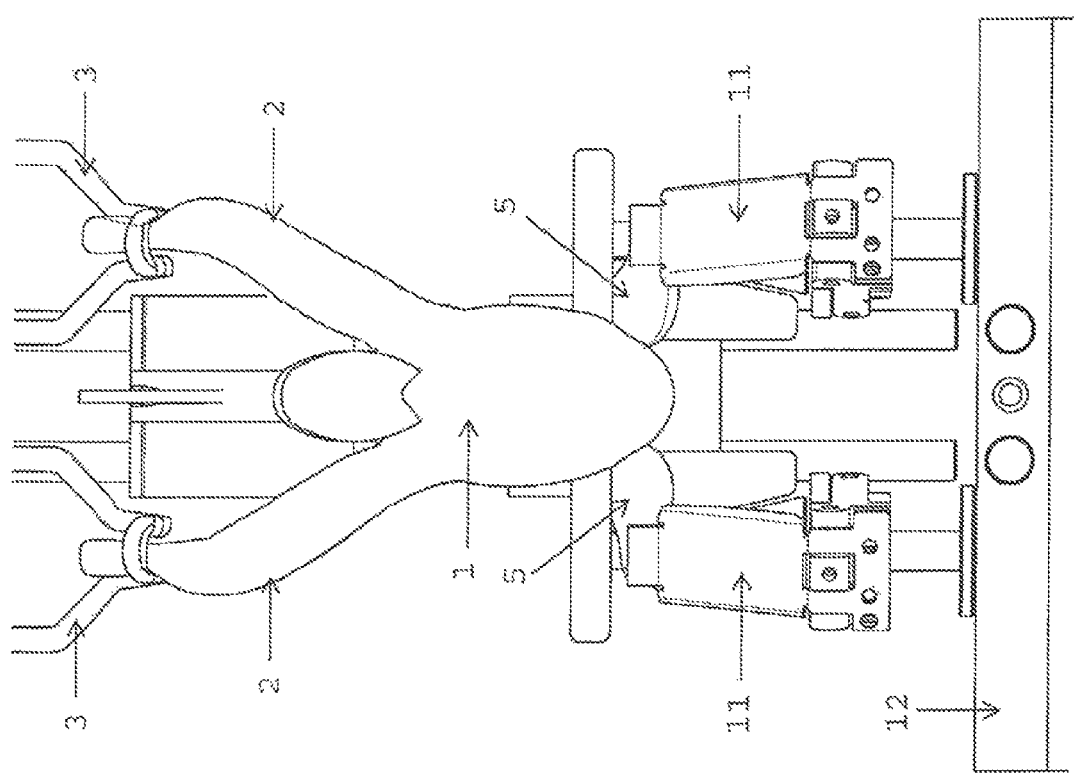

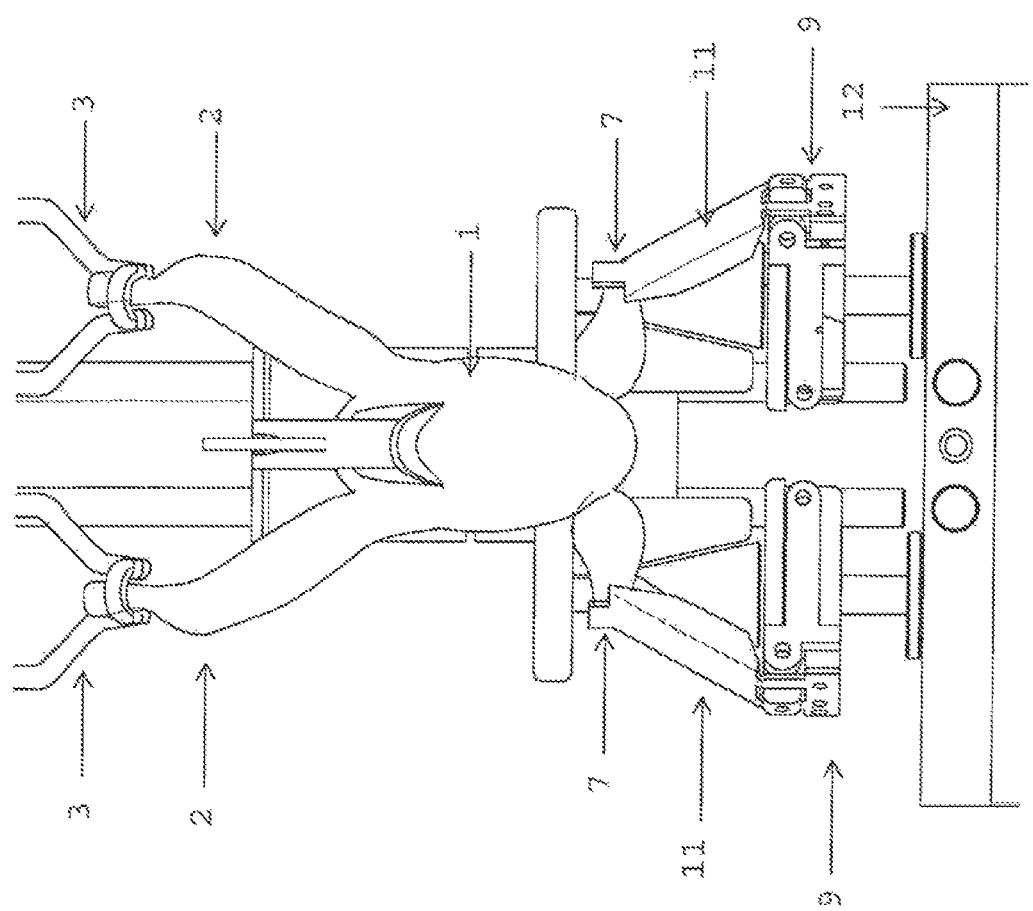
Fig: 3.C

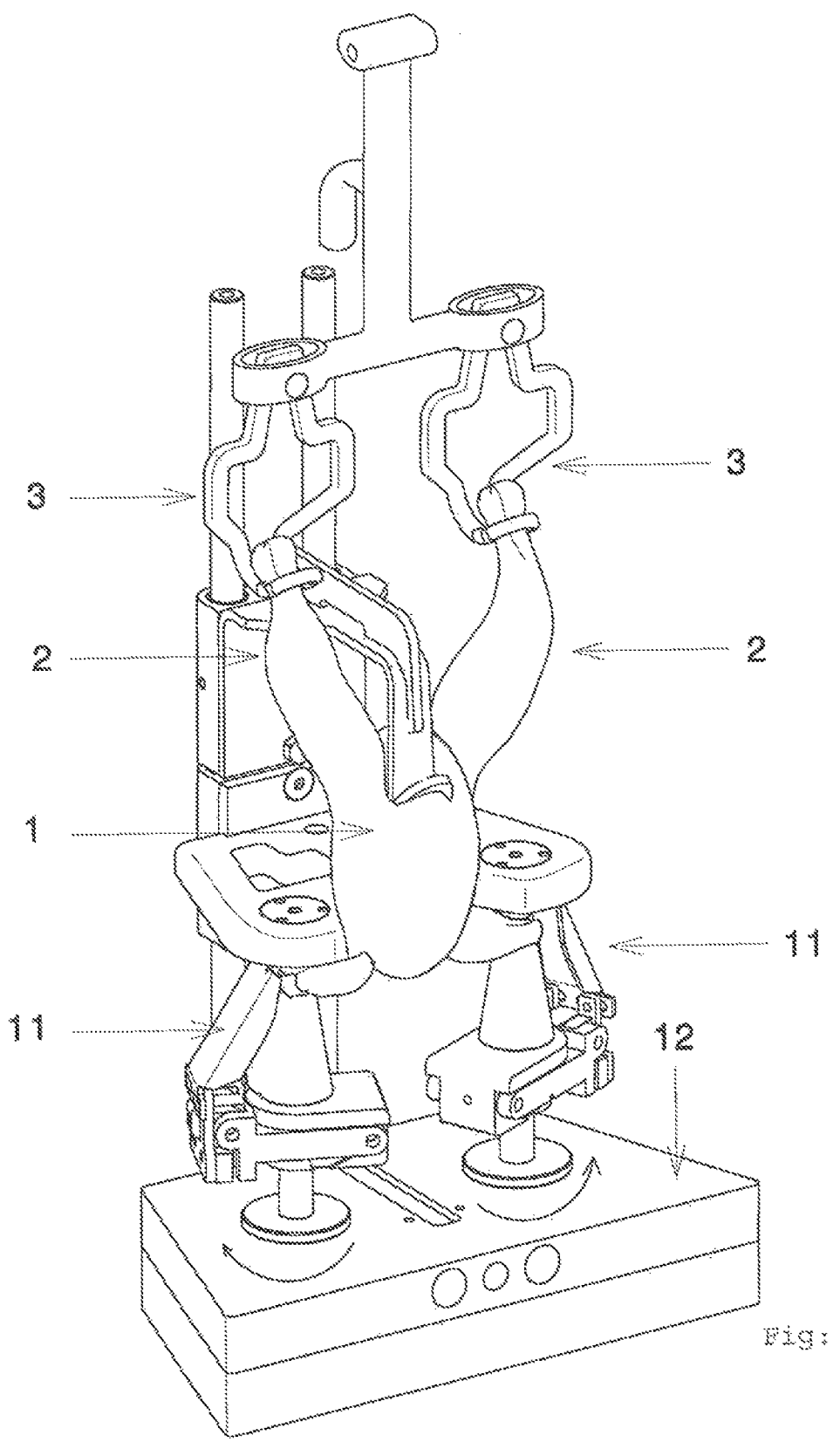
Fig: 3.D

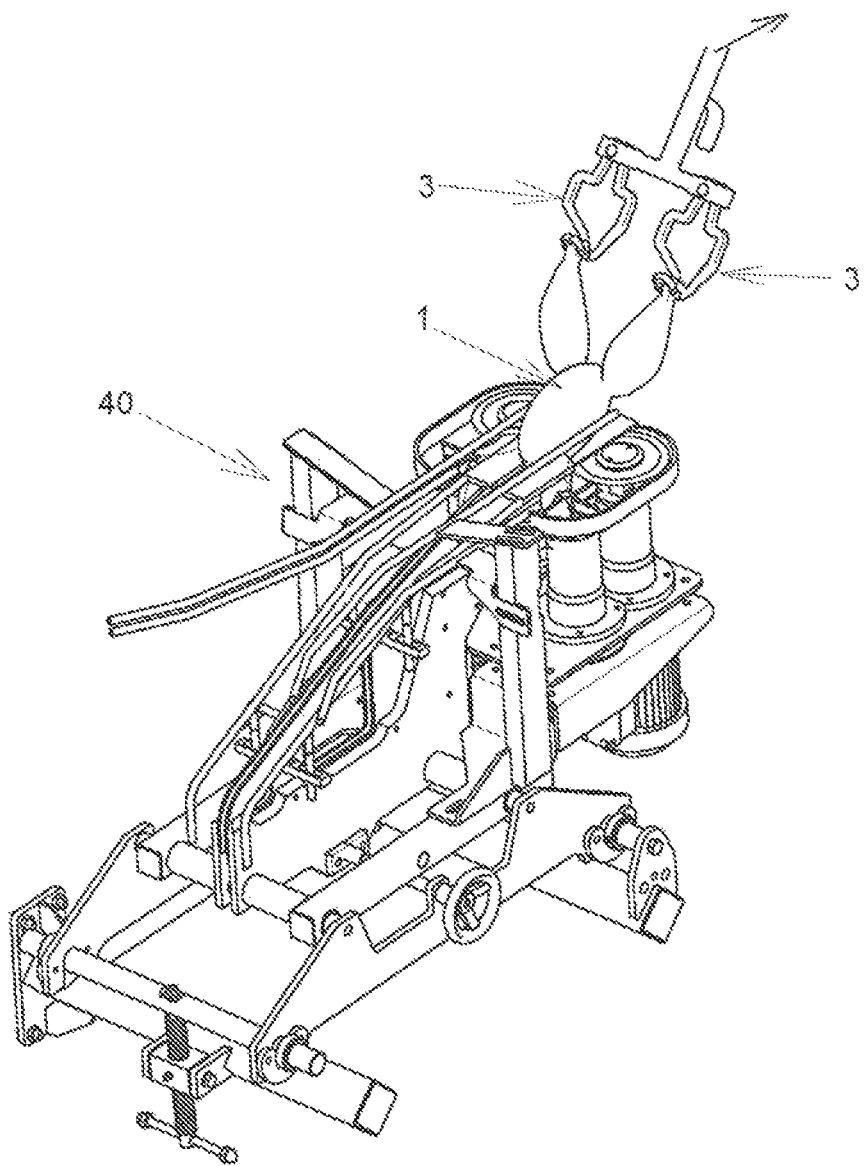
Fig: 4A

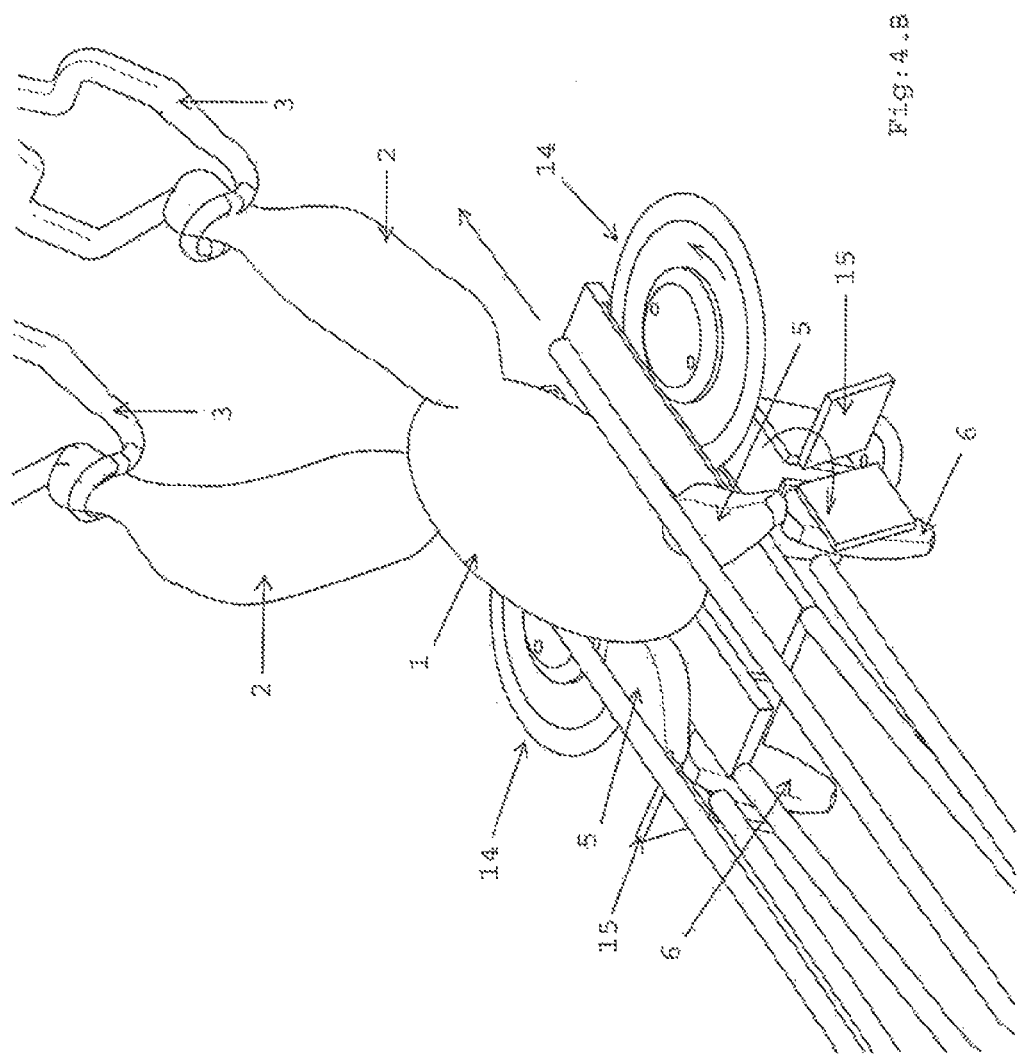

METHOD AND APPARATUS FOR PROCESSING A WING OF A POULTRY CARCASS WHILE THE WING IS ATTACHED TO SAID POULTRY CARCASS

FIELD OF THE INVENTION

The invention relates to a method and apparatus for processing a wing of a poultry carcass while the wing is attached to the poultry carcass.

BACKGROUND OF THE INVENTION

The person skilled in the art knows that a poultry's wing includes an upper wing (also called drummette), a midwing, and a wingtip. At the elbow joint that connects the upper wing with the midwing a capsule and ligament are provided.

EP-B-1 868 443 indicates a method and apparatus for processing a wing of a poultry carcass in which the wing is still attached to the poultry carcass and wherein the processing results in separation of the midwing from the upper wing. The known method includes the step of cutting the wing in the upper wing adjacent to the elbow joint. However, this step merely amounts to a cutting through the skin that has been placed under tension and is applied to reduce this tension so that thereafter the upper wing and midwing can be moved apart more easily. Further cutting means are applied that cut into the capsule in the vicinity of the elbow joint without, however, damaging the bones of the upper wing and midwing. Moving apart of the upper wing and midwing is executed in a subsequent step of bending the midwing in relation to the upper wing by moving it counter to the pivot direction of the elbow joint for separating the bones of the midwing and the upper wing. After this separation step is completed, the midwing is cut loose from the upper wing while the latter remains attached to the poultry carcass.

Although EP-B-1 868 443 claims that twisting the midwing in relation to the upper wing so as to cause the elbow joint to break brings about that the capsule will come off the humurus bone of the upper wing and be carried along with the midwing, it is clear that the taught cutting in the very capsule results in incomplete or unreliable removal of the capsule from the upper wing. It may even happen that cutting in the capsule results in unintended damaging of the bones of the upper wing and/or midwing, which may cause bone splinters to become part of the midwing after separation of the upper wing.

SUMMARY OF THE INVENTION

The invention is aimed at providing a solution for at least these problems and, to that end, a method and apparatus are proposed in accordance with any one of the appended claims. Aspects and advantages of the invention will be set forth in part in the following description, or may be obvious from the description, or may be learned through practice of the invention.

In a first exemplary aspect, the method of the invention is executed with the step of cutting the wing in the upper wing adjacent to the elbow joint, whereby the cutting is executed to cut through the ligament that provides a connection between the midwing and upper wing. This releases the connection between the midwing and the upper wing and makes it easier to perform a further step of twisting the midwing in relation to the upper wing. It further avoids the necessity in the prior art to cut through the capsule of the elbow joint, which can now be avoided.

Preferably the twisting of the midwing in relation to the upper wing is executed to cause that the elbow joint becomes dislocated.

It has proven beneficial for the promotion of a high production rate to execute the processing while the poultry carcass or poultry carcasses are conveyed in a conveyor line in which they are suspended by the legs.

Accordingly the invention is also embodied in an exemplary apparatus for processing a wing of a poultry carcass while the wing is attached to the poultry carcass. The exemplary apparatus includes a suspension conveyor for conveying the poultry carcass while it is suspended by the legs. The exemplary apparatus further includes first cutting means, means for cutting the wing in the upper wing adjacent to the elbow joint, means for twisting the midwing in relation to the upper wing for separating the bones of the midwing and the upper wing, and second cutting means for cutting the midwing loose from the upper wing while the latter remains attached to the poultry carcass, and wherein the first cutting means are arranged to cut through the ligament that provides a connection between the midwing and upper wing.

Preferably in accordance with a further aspect of the invention the means for twisting of the midwing in relation to the upper wing is arranged to cause that the elbow joint eventually is dislocated.

It is preferred that the apparatus has pressure means arranged to be operative on the mid-wing as the second cutting means are operative for cutting the midwing loose from the upper wing while the latter remains attached to the poultry carcass. This improves the quality of the cut due to the fixing of the mid-wing in its dislocated position.

The exemplary apparatus of the invention is suitably embodied with means for twisting of the midwing in relation to the upper wing. In this exemplary apparatus, such means includes gripper means for gripping the midwing, which gripper means are rotatably positioned on a frame to enable that a spatial position of the midwing in comparison with the upper wing is changed by a full or partial rotation of the gripper means.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of an exemplary embodiment of an apparatus in accordance with the invention that is arranged to implement the method of the invention. A full and enabling disclosure of the present invention, including the best mode thereof, directed to one of ordinary skill in the art, is set forth in the specification, which makes reference to the appended figures, in which:

In the figures:

FIGS. 2A-2B show the operation of first cutting means for cutting the ligaments in the upper wing adjacent to the elbow joint of a wing attached to a poultry carcass suspended by the legs.

FIGS. 3A-3D show the operation of gripper means acting on the midwing to dislocate the elbow joint that connects the midwing to the upper wing.

FIGS. 4A-4B show the cutting operation to completely separate the midwing from the upper wing while the upper wing is still attached to the poultry carcass.

Whenever in the figures the same reference numerals are applied, these numerals refer to the same parts.

DETAILED DESCRIPTION OF THE INVENTION

Figure 1:
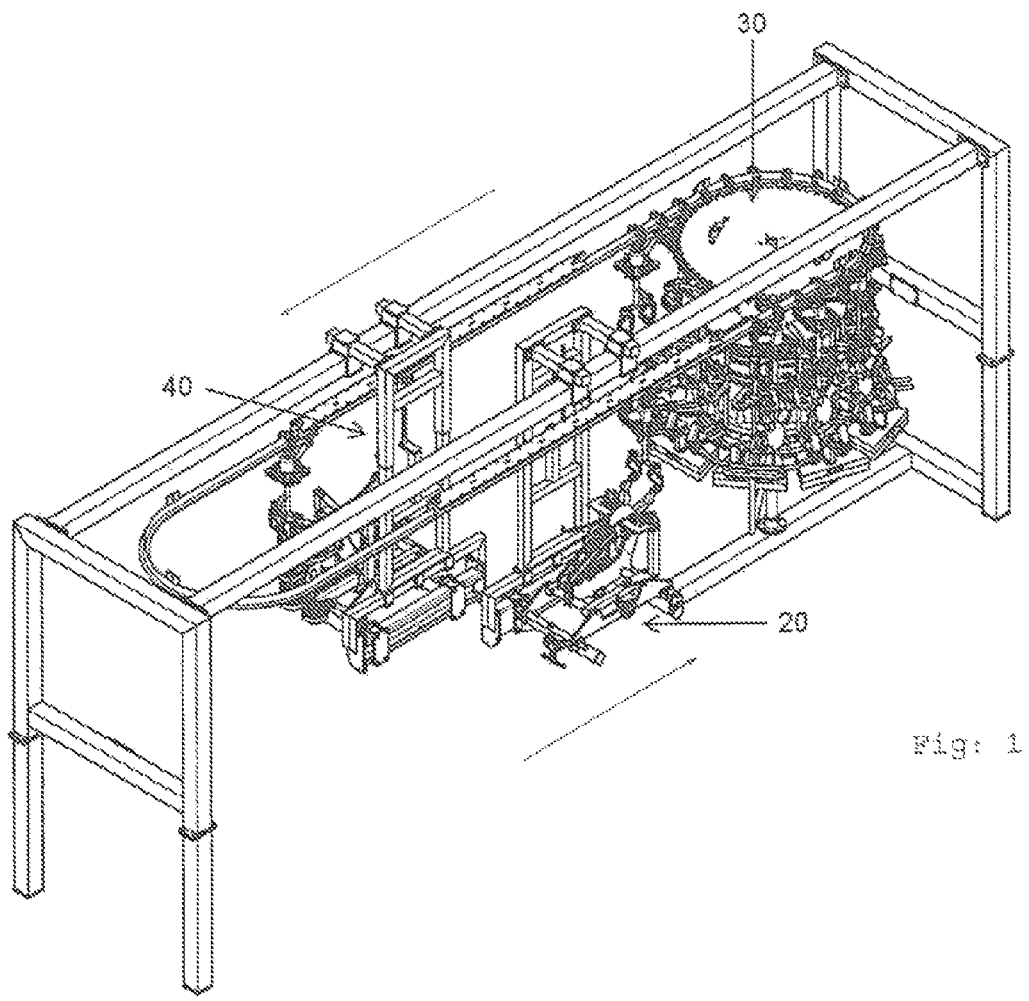
FIG. 1 shows a perspective view of an exemplary apparatus of the invention.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

With reference first to FIG. 1, a poultry carcass 1 is shown while it is suspended by the legs 2 in hooks 3 of a suspension conveyor along sequentially a pre-cutter 20, a carousel-type elbow dislocating unit 30, and a midwing-cutter 40. In such a suspension conveyor, which is well known to those skilled in the art, the hooks 3 are connected to trolleys (not shown) that move along a conveyor track. By application of a series of such trolleys that move along an endless conveyor track, a large number of poultry carcasses can be moved along processing apparatuses for having the carcasses processed at high speed, for instance 6000 carcasses per hour.

FIGS. 2A-2B further show the pre-cutter 20. In FIG. 2A, but in particular in FIG. 2B, it is clearly shown that the poultry carcass 1 has wings 4. The wings 4 each include an upper wing 5 or drummette which is closest to the carcass 1, and a midwing 6 that connects to the upper wing 5 through the elbow joint 7. In these FIGS. 2A/2B the wingtip is missing, but the invention could equally well be applied when the wingtip would still be attached at the side of the midwing 6 that is farthest from the carcass 1. The person skilled in the art knows further that at the elbow joint 7 that connects the upper wing 5 with the midwing 6, a capsule and ligaments are present.

FIG. 2B further shows that the pre-cutter 20 of the apparatus of the invention is embodied with first cutting means 8 for cutting the wing 4 in the upper wing 5 adjacent to the elbow joint 7. This cutting is executed in order to cut through the ligament that provides a connection between the midwing 6 and upper wing 5. After that the following steps can be executed which entail the moving of the midwing 6 in relation to the upper wing 5 for separating the bones of the midwing 6 and the upper wing 5, and the cutting loose of the midwing 6 from the upper wing 5 while the latter remains attached to the poultry carcass 1. This is all shown in the following FIGS. 3-4.

FIG. 3A provides a detailed view to the elbow dislocating unit 30 in an exemplary apparatus of the invention as shown in FIG. 1. This elbow dislocating unit of the exemplary apparatus of the invention is embodied with means 9 for moving the midwing 6 in relation to the upper wing 5 for separating the bones of the midwing 6 and the upper wing 5. The means 9 are embodied with gripper means 11 for gripping the midwing 6 as is shown in FIG. 3B, and these gripper means 11 are rotatably positioned on a frame 12 to enable that a spatial position of the midwing 6 in comparison with the upper wing 5 is changed by a full or partial rotation of the gripper means 11. This (partial) rotation is completed in FIG. 3C, resulting in a dislocation of the elbow joint 7. FIG. 3D equates with the situation shown in FIG. 3C, as seen from a different perspective, however.

Following the dislocation of the elbow joint 7 which is completed in FIGS. 3C-3D, a further operation with a midwing cutter 40 (see FIG. 1) is executed. This mid-wing cutter 40 is shown in FIGS. 4A-4B, and FIG. 4B shows that it is embodied with cutting means 14 that are arranged to completely separate the midwing 6 from the upper wing 5, whereby the upper wing 5 remains yet attached to the poultry carcass 1. Within the scope of the invention it is also possible that thereafter the upper wing 5 is separated from the poultry carcass 1. This can be done with any suitable means that known to the person skilled in the art, for instance with the apparatus disclosed in U.S. Pat. No. 5,176,564.

FIGS. 4A-4B also provide a view at pressure means 15 that are arranged to be operative on the mid-wing 6 as the second cutting means 14 are operative for cutting the midwing 6 loose from the upper wing 5 while the latter remains attached to the poultry carcass 1. This improves the repeatability of the wing cutting and the quality of this cut.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A method for processing a wing of a poultry carcass while the wing is attached to the poultry carcass, the wing comprising an upper wing, and a midwing, wherein at an elbow joint that connects the upper wing with the midwing a capsule and ligament is provided, the method comprising the steps of:
    cutting the wing in the upper wing adjacent to the elbow joint;
    moving the midwing in relation to the upper wing for separating the bones of the midwing and the upper wing; and
    cutting the midwing loose from the upper wing while the latter remains attached to the poultry carcass, said step of cutting occurring through the ligament that provides a connection between the midwing and upper wing so as to result in separation of the midwing from the upper wing.

2. A method for processing a wing of a poultry carcass as in claim 1, wherein said step of moving of the midwing in relation to the upper wing comprises causing the elbow joint to become dislocated.

3. A method for processing a wing of a poultry carcass as in claim 2, further comprising avoiding cutting through the capsule at the elbow joint.

4. A method for processing a wing of a poultry carcass as in claim 1, further comprising avoiding cutting through the capsule at the elbow joint.

5. A method for processing a wing of a poultry carcass as in claim 1, wherein the processing is executed while the poultry carcass is suspended by the legs.

6. An apparatus for processing a wing of a poultry carcass while the wing is attached to the poultry carcass, the wing comprising an upper wing, and a midwing, and wherein at an elbow joint that connects the upper wing with the midwing a capsule and a ligament are provided, the apparatus comprising:

- a suspension conveyor for conveying the poultry carcass while it is suspended by the legs;
- first cutting means for cutting the wing in the upper wing adjacent to the elbow joint;
- means for moving the midwing in relation to the upper wing for separating the bones of the midwing and the upper wing; and
- second cutting means for cutting the midwing loose from the upper wing while the latter remains attached to the poultry carcass;
- wherein said first cutting means are arranged to cut through the ligaments that provide a connection between the midwing and upper wing.

7. An apparatus for processing a wing of a poultry carcass as in claim 6, wherein said means for moving of the midwing in relation to the upper wing is configured to cause the elbow joint to become dislocated.

8. An apparatus for processing a wing of a poultry carcass as in claim 7, wherein said means for moving of the midwing in relation to the upper wing comprises gripper means for gripping the midwing, said gripper means being rotatably positioned on a frame to enable that a spatial position of the midwing in comparison with the upper wing is changed by a full or partial rotation of the gripper means.

9. An apparatus for processing a wing of a poultry carcass as in claim 6, wherein said means for moving of the midwing in relation to the upper wing comprises gripper means for gripping the midwing, said gripper means being rotatably positioned on a frame to enable that a spatial position of the midwing in comparison with the upper wing is changed by a full or partial rotation of the gripper means.

10. An apparatus for processing a wing of a poultry carcass as in claim 9, further comprising pressure means arranged to be operative on the mid-wing as the second cutting means are operative for cutting the midwing loose from the upper wing while the latter remains attached to the poultry carcass.

* * * * *